United States Patent

Kahr

Patent Number: 6,135,249
Date of Patent: Oct. 24, 2000

[54] RAILWAY BRAKE SHOE BACKING PLATE WITH IMPROVED MOUNTING ALIGNMENT FEATURE

[75] Inventor: Joseph C. Kahr, Southern Pines, N.C.

[73] Assignee: Westinghouse Air Brake Company, Wilmerding, Pa.

[21] Appl. No.: 08/993,069

[22] Filed: Dec. 18, 1997

[51] Int. Cl.[7] ........................................ F16D 65/04
[52] U.S. Cl. ................ 188/242; 188/234; 188/258; 188/247
[58] Field of Search ................. 188/250 R, 248, 188/247, 235, 233.3, 236, 242–246, 234, 252, 253, 254, 219.6, 220.1, 220.6, 221.1, 222.1, 237, 238, 250 G, 250 F, 250 B, 33, 56, 57, 255, 249, 259, 261, 258

[56] References Cited

U.S. PATENT DOCUMENTS

| | | | |
|---|---|---|---|
| 785,303 | 3/1905 | Gallagher | 188/247 |
| 788,850 | 5/1905 | Sargent | 188/248 |
| 1,027,081 | 5/1912 | Simpson | 188/258 |
| 1,065,714 | 6/1913 | Pettis | 188/258 |
| 1,065,715 | 6/1913 | Pettis | 188/258 |
| 1,065,719 | 6/1913 | Pettis | 188/258 |
| 1,100,092 | 6/1914 | Pettis | 188/258 |
| 1,100,093 | 6/1914 | Pettis | 188/258 |
| 1,470,477 | 10/1923 | Pettis | 188/258 |
| 1,488,513 | 4/1924 | Pettis | 188/258 |
| 2,331,563 | 10/1943 | Murphy | 188/247 |
| 2,885,037 | 5/1959 | Wilson . | |

FOREIGN PATENT DOCUMENTS

| | | | |
|---|---|---|---|
| 12147 | 5/1904 | United Kingdom | 188/248 |

*Primary Examiner*—Douglas C. Butler
*Attorney, Agent, or Firm*—James Ray & Associates

[57] ABSTRACT

A brake shoe for a railway vehicle having a three-piece backing plate formed of a longitudinal main plate portion having a front surface to which a friction material is attached, and an end-plate portion attached to each end of the longitudinal main plate portion. Each of the end plate portions having, a pair of wall members extending generally perpendicularly therefrom adapted to engage not only the edge surface of a the main plate portion but also the edge surfaces of the brakehead to which the three-piece backing plate is attached.

20 Claims, 4 Drawing Sheets

RAILWAY BRAKE SHOE BACKING PLATE WITH IMPROVED MOUNTING ALIGNMENT FEATURE

FIELD OF THE INVENTION

This invention relates generally to brake shoes for railway vehicles; i.e., railway cars and locomotives, and means for maintaining such brake shoes properly aligned with the brakehead and wheel. More particularly, this invention relates to a new and unique three-piece backing plate for railway brake shoes having an improved alignment feature for maintaining alignment of the brake shoe on the brakehead to prevent lateral misalignment and twisting of the brake shoe relative to the longitudinal centerline of the brakehead.

BACKGROUND OF THE INVENTION

Railway brake shoes are typically mounted on brake rigging of railway vehicles by means if a brake shoe key, which passes through a longitudinal slot in the brake shoe holder or "brakehead" of the brake rigging and concurrently through mounting holes of the brake shoe backing plate, such holes being located in a central "keybridge" area of the brake shoe backing plate. The keybridge area of the backing plate is generally formed in such a way that it is adapted to protrude into or intersect with a longitudinal slot in the brakehead at or near the center of the brakehead's length. As a result of this centrally located point of attachment and the inherent clearance tolerances that are needed to allow ease of fit, it is possible for the brake shoe to become misaligned relative to the brakehead face when lateral forces are exerted on the sides of the brake shoe. Depending on the location of any such lateral force and its contact location with the brake shoe, the misalignment may be either rotational with the brake shoe rotating at the keybridge so that it is pivoted on the brakehead, or in a parallel sense relative to the length of the brakehead, with the brake shoe displaced linearly relative to the brakehead.

In prior art brake shoe backing plates, various types of lugs or protrusions on the back, convex external surface of the brake shoe backing plate have been employed to guard against this type of misalignment by interlocking such lugs with mating cavities located on the surface of the brakehead. However, the size of these lugs and their longitudinal distance from the central keybridge area are necessarily small relative to the overall length of the brakehead, in order to maintain structural strength of the brakehead sidewalls and to provide as large as possible contact area between the brakehead face and the backing plate of the brake shoe for optimum distribution of normal brake shoe forces. As a result a considerable degree of movement remains possible between the brake shoe and brakehead. When lateral force is applied to the brake shoe it is therefore often possible for misalignment to result, with the effect that the brake shoe is not brought into proper contact alignment with the wheel of the railway car or locomotive. This is detrimental to the proper functioning and structural integrity of the brake shoe, and the wear life of the brake shoe and wheel.

Lug arrangements which overlap the external surfaces of the brakehead rather than interlocking with cavities on the brakehead face, have been proposed in the past, but such proposals have not been successful due either to the need for welding several small pieces to the backing plate (which is difficult to do in a reliable and cost effective manner), or due to weakness of the lugs attached to the outer perimeter of the backing plate for this purpose.

SUMMARY OF THE INVENTION

This invention is predicated on the conception and development of a new and improved backing plate design that provides a reliable method of assembling an integrally molded brake shoe with an external lug feature acting at the extreme end corners of the brakehead, resulting in maximum possible resistance to twisting and lateral misalignment of the brake shoe on the brakehead. Furthermore, one embodiment of the invention additionally incorporates corresponding internal alignment lugs of the type used on previous brake shoe designs for the same brakehead in a way that assures proper correlation of the internal and external dimensional alignments, and is incorporated into the design mechanism for attachment of the external lugs to the main body of the brake shoe backing plate and provides resistance to tangential forces on the external lug assembly.

In essence the inventive brake shoe is one having a three-part backing plate, one central, main plate portion similar to current state of the art backing plates, and two end plates portions, one each attached to each longitudinal end of the main plate portion which accomplish and provide the external alignment feature. Accordingly, the novel features of the invention resides in the design of the end plate portions and their system for attachment to the main plate portion, which includes a unique and novel means for engaging the sides of the brakehead at points displaced as far away from the keybridge as possible to keep the three-piece brake shoe aligned thereon, such that the possibility for misalignment is greatly minimized.

OBJECTS OF THE INVENTION

Accordingly, it is a primary object of this invention to provide a new and improved brake shoe for railway vehicles having improved means thereon for maintaining proper alignment of the brake shoe on the brakehead.

Another primary object of this invention is to provide a new and improved backing plate for brake shoes on railway vehicles having improved means thereon for properly maintaining alignment of the brake shoe on the brakehead.

A further object of this invention is to provide a new and improved means for properly maintaining alignment of brake shoes attached to brakeheads on railway vehicles.

Still another object of this invention is to provide a unique three-piece backing plate for brake shoes for railway vehicles which includes positive means for locking the end extremities of the brake shoe to the brakehead.

An even further object of this invention is to provide a unique three-piece backing plate for brake shoes of railway vehicles which includes positive means for locking the end extremities of the brake shoe to the brakehead without the need to weld lugs to the backing plate or brakehead.

These and other objects and advantages of this invention will become apparent after a full reading of the following detailed description, particularly, when read in conjunction with the attached drawings as described below and the appended claims.

DESCRIPTION OF THE PRESENTLY PREFERRED EMBODIMENT OF THE INVENTION

Figure 1:
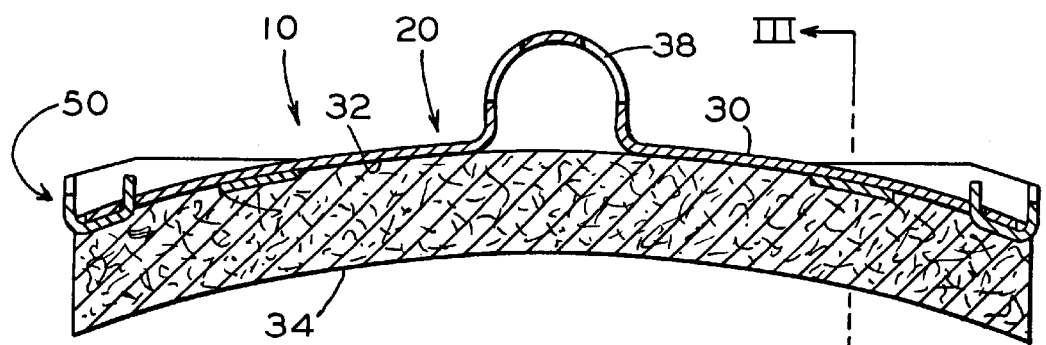
FIG. 1 is a cross-sectional side view of a brake shoe in accordance with a presently preferred embodiment of this invention incorporating the unique three-piece backing plate, with the section taken at the longitudinal center line of the brake shoe.

Prior to proceeding with a detailed description of the subject invention, it is noted that for the sake of clarity, identical components which have identical functions have been identified with identical reference numerals throughout the several views of the attached drawings.

Figure 2:
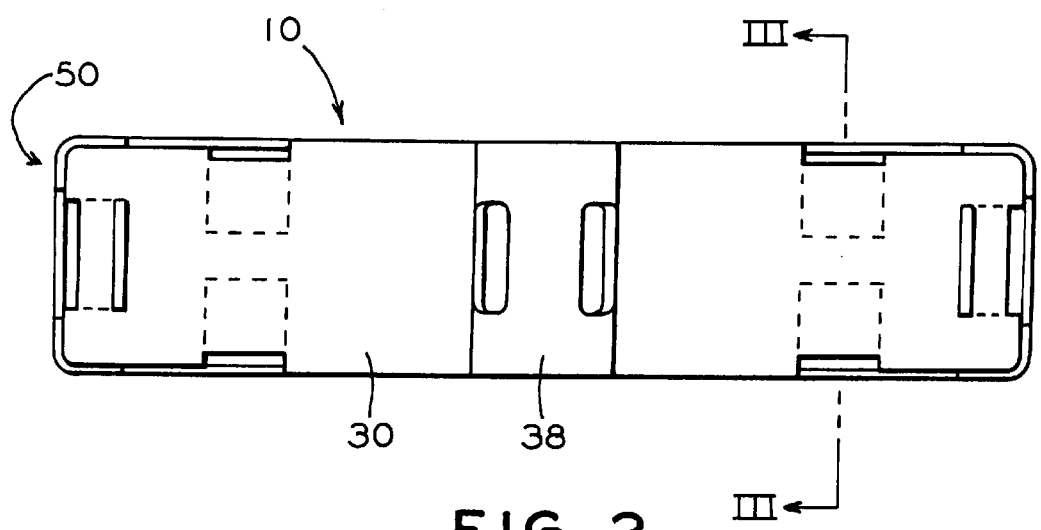
FIG. 2 is a top view of the brake shoe shown in FIG. 1.
Figure 3:
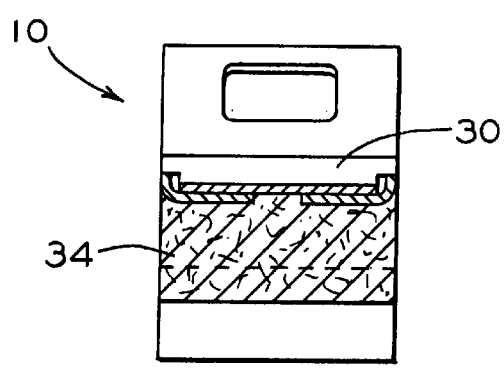
FIG. 3 is a cross-sectional end view of the brake shoe shown in FIGS. 1 and 2 with the section line taken at line III—III of FIGS. 1 and 2.
Figure 5:
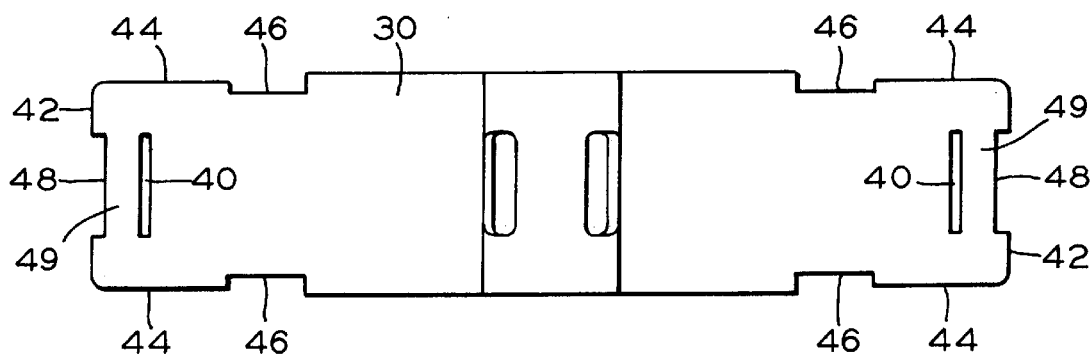
FIG. 5 is a top view of the main plate portion of the backing plate shown in FIG. 4.
Figure 9:
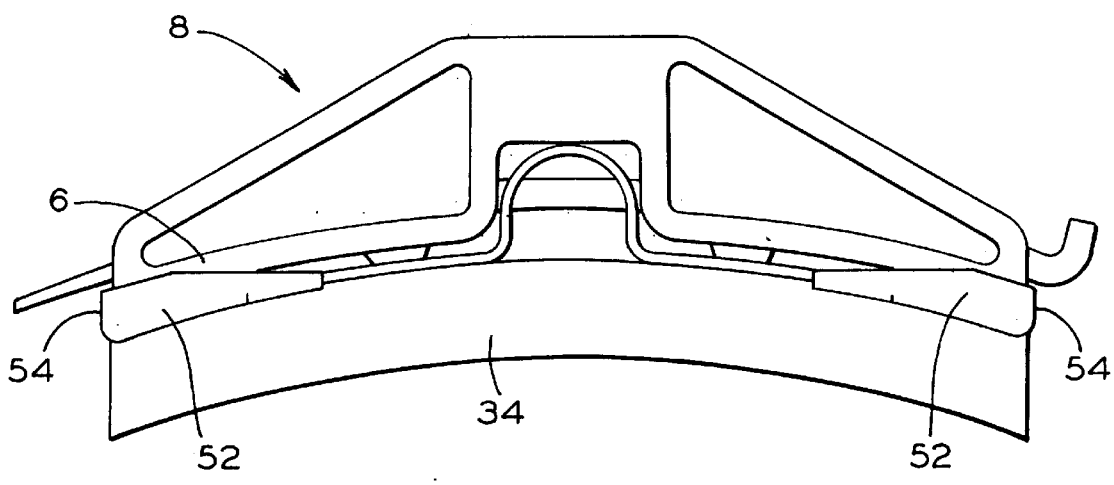
FIG. 9 is a side view of the brake shoe shown in FIGS. 1–3 as it appears when attached to a brakehead.
Figure 6:
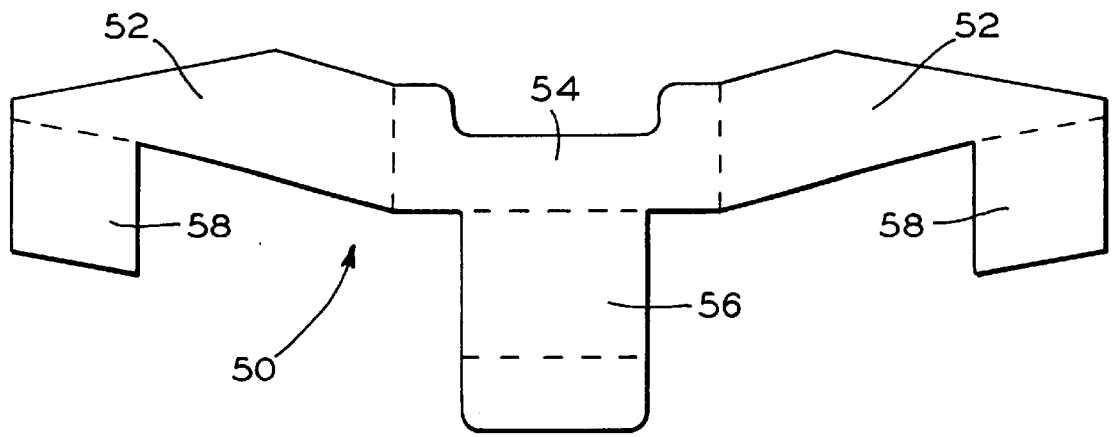
FIG. 6 is a plan view of a stamped sheet metal form used to shape and form the end plate portion of the backing plate of this invention as it appears before the sheet metal form is bent to shape and form the end plate portion of the backing plate.
Figure 7:
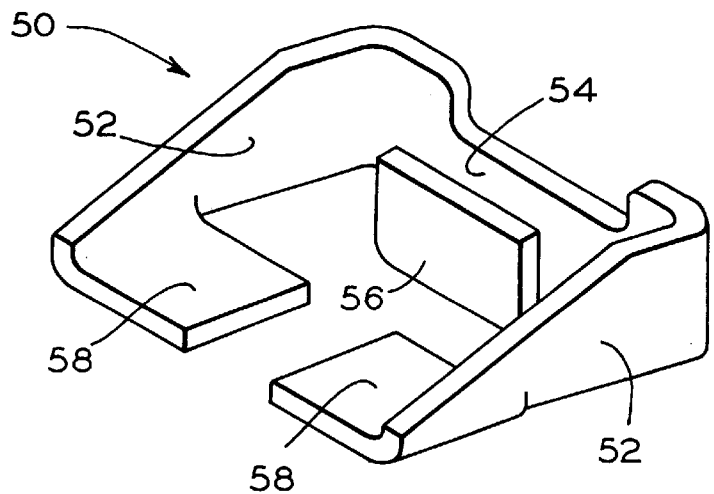
FIG. 7 is an isometric view of the end plate portion of the backing plate as it appears after the stamped sheet metal form shown in FIG. 4 is bent to shape and achieve such an end plate.

Reference to FIGS. 1–3 will illustrate a brake shoe 10 in accordance with a presently preferred embodiment of this invention incorporating the unique backing plate 20 as better illustrated in FIGS. 5–7. As shown in FIGS. 5–7, the backing plate 20 essentially comprises three separate elements made of a relatively thick and strong sheet steel material, namely an arcuate main plate portion 30, adapted to receive and hold a braking friction material 34 on its concave face 32, with an end plate portion 50 attached to each longitudinal end 38 of the main plate portion 30. The relative configurations of the main plate portion 30 and the two end plate portions 50 are such that they can be joined together to form the unique backing plate 20 in a manner that assures and maintains a proper alignment with each other, as well as assure and maintain proper alignment of the completed backing plate 20 (and brake shoe 10) onto the brakehead 8 (FIG. 8) when mounted thereon as described below.

Figure 4:
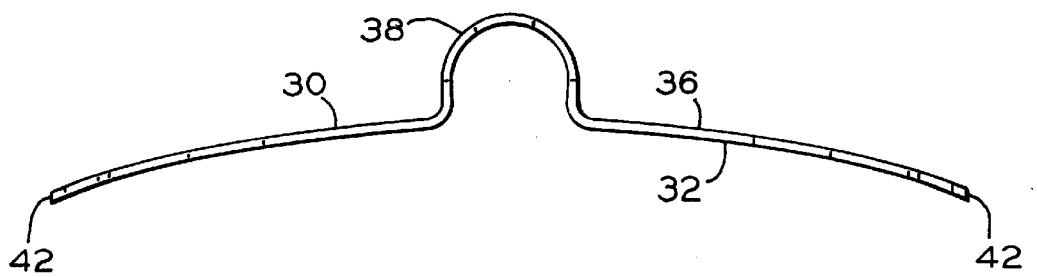
FIG. 4 is a side view of the main plate portion of the backing plate as it appears before the two end plates are attached thereto.

Pursuant to a presently preferred embodiment of this invention, and as best shown in FIGS. 4 and 5, main plate portion 30 is normally arcuate in shape having a concave face 32 to which a conventional friction material 34 is attachable by bonding the friction material thereto. As will be explained below, the friction material 34 is not bonded onto concave face 32 until after the three-piece backing plate 20 is assembled. Techniques and procedures for bonding a friction material to a backing plate are well known in the art, and therefore, need not be described in detail here. The convex, backside 36 of main plate portion 30 is provided with a centrally located keybridge 38 which is utilized to attach the brake shoe 10 to a brakehead 8. As is also well known in the art, the design and configuration of the keybridge 38 may vary considerably, but normally comprises a loop-type of extension which is adapted to fit through a centrally located recess or aperture in the brakehead 8, with a locking means (not shown) inserted through the loop-type extension (keybridge) to lock the brake shoe 10 in place against the concave face of the brakehead 8.

A pair of elongated, rectangular apertures 40 are provided through the face of the main plate portion 30, one each spaced from and substantially parallel to each extreme forward end 42 of the main plate portion 30. Preferably, the side edges 44 of the main plate portion 30 are provided with a pair of opposed side notches 46 which are spaced back from each extreme forward end 42 of the main plate portion 30, and a like end notch 48 is centrally located in the edge of each extreme forward end 42, having a width generally equal to that of the adjacent apertures 40, such that a strip 49 of main plate 30 is provided between each notch 46 and elongated aperture 40. As described below, side notches 46 and end notches 48 are provided to permit end plate portions 50 to be tightly joined onto main plate portion 30.

Each end plate portion 50, also made of a relatively thick sheet steel material, is made by first cutting the sheet steel into a flat-shaped configuration as illustrated in FIG. 6, and then bending the cut, flat form to shape a three-sided, box-like form, or end plate portion 50 as shown in FIG. 7. Ideally, the end plate portions 50 are bent to shape the form shown in FIG. 7 as they are joined onto the main plate portion 30. Each shaped end plate portion 50, as shown in FIG. 7, includes a pair of opposed and parallel side walls 52 adapted to engage the parallel side edges of the main plate portion 30 adjacent to extreme forward end 42, as well as eventually engage the side edge surfaces 6 of the brakehead 8 to which the completed brake shoe 10 is to be attached. Also, preferably included is an end wall 54 joining the forward ends of side walls 52 and forming right angles therewith, so that end wall 54 will likewise abut against and engage the extreme forward end 42 of the main plate 30, as well as eventually engaging the extreme forward end of the brakehead 8 to which the brake shoe is to be attached. In this way, side walls 52 and end wall 54 engage all three sides of the two distal ends of the main plate 30 as well as eventually engaging the brakehead 8 to which the brake shoe 10 is to be attached. Each end plate portion 50 also includes an elongated tab member 56, which extends from the mid-portion of the underside of end wall 54, and is bent upwardly into a U-shape so that it will pass under strip 49 with its tip fitted upwardly into the adjacent elongated, rectangular apertures 40. Also included are a pair of opposed side tabs 58, which are bent inwardly from the bottom of side walls 52 towards each other.

Figure 8:
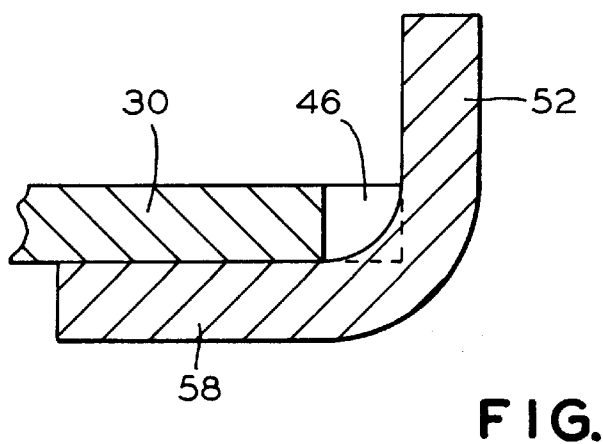
FIG. 8 is an enlarged, cross-sectional, detail view showing how the bent tabs on the end plate portions engage the notches on the main plate portion to lock them in place.
Figure 10:
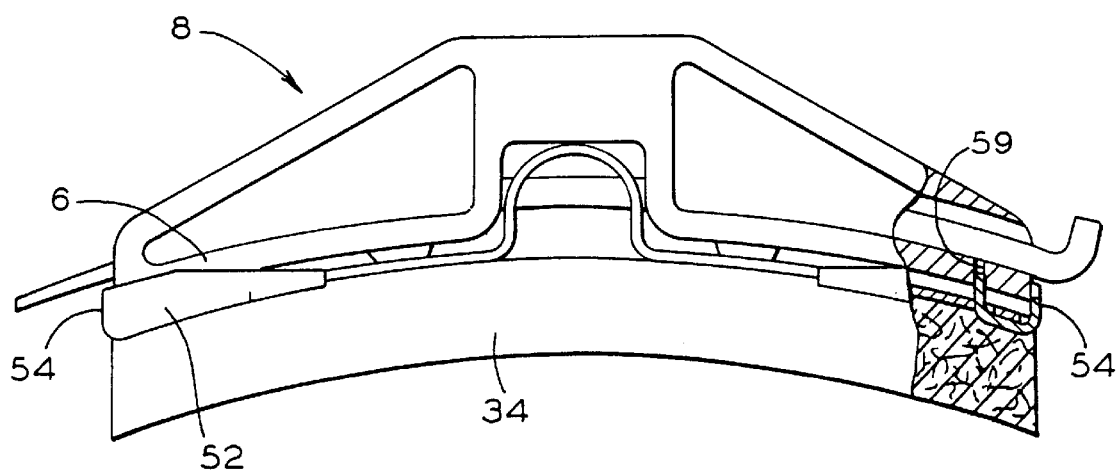
FIG. 10 is a partial cutaway side view of the brake shoe shown in FIGS. 1–3 as it appears when attached to a brakehead showing the modification of the brakehead according to an alternate embodiment.

To join end plate portions 50 to the main plate portion 30, a tab member 56 is inserted into rectangular aperture 40 from the underside, and then side tabs 58 are bent inwardly after the end plate portions 40 are joined to the underside of the main plate portion 30, so that the curved bent portion of side tabs 58 will naturally engage opposed side notches 46. As shown in FIG. 8, the inside curvature of the side tab member 58, as bent, will naturally extent into the side notches 46 to virtually lock them in place within side notches 46. In a like manner, tab member 56 will be bent so that the inside curvature of tab member 56 will, when bent, extend into end notch 48. Accordingly, each end plate portion 50 is held against the convex underside of main plate portion 30 by bent side tabs 58 which are bent around the side edges of main plate portion 30 such that the side tabs 58 will engage side notches 46, while at the same time bent tab member 56 engages end notch 48, passes under strip 49 and its end inserted upwardly into elongated aperture 40. Only at that point in time can the friction material 34 be bonded onto the concave face 32 of main plate portion 30 so that it will also overlay and be bonded to side tabs 58 and tab member 56, as well as concave face 32. Accordingly, the bonding of the friction material 34 onto concave face 32 and side tabs 58 and tab member 56, will serve to produce the composite, and rigid one piece brake shoe 10, which can thereafter be joined onto a brakehead 8, pursuant to more conventional techniques.

To achieve the purposes of this invention, of course, the concave face of brakehead 8 must be such that it is the same size and configuration as the convex back side of brake shoe 10, so that side walls 52 on the brake shoe 10 will engage tightly against the side edges 6 of the brakehead 8, and at the same time end walls 54 will engage tightly against the extreme ends of brakehead 8. With the side walls 52 and end walls 54 engaging the extreme ends of the brakehead 8, there will be very little likelihood for the brake shoe 10 to become misaligned on the brakehead 8 regardless of the nature of any lateral forces that may result on the sides of the brake shoe 10.

While the above detailed description illustrates a presently preferred embodiment of the subject invention, there are obviously a great number of modifications that could be incorporated and different embodiments devised without departing from the spirit of the invention. For example, in the above described embodiment, it was noted that tab member 56 was insertable into elongated, rectangular aperture 40. This would suggest that ideally, the end of tab member 56 be of rectangular form and having a length only sufficient to be inserted into the aperture 40. As suggested above, however, tab member 56 can be made to have a length sufficient to pass through and beyond aperture 40 so that it too can function as an alignment lug intended to engage a receiving aperture 59 in the concave face of the brakehead 8. This modified embodiment would provide an internal lug, namely tab member 56, in addition to the external lugs (i.e., side walls 52 and end wall 54) to thereby enhance anchoring of the brake shoe 10 to the brakehead 8. It should be apparent that a number of other modifications could be made and other embodiments devised without departing from the spirit of the invention.

I claim:

1. A three-piece backing plate for a railway vehicle brake shoe, said three-piece backing plate comprising a longitudinal main plate portion having a front surface to which a friction material is attachable, and an end-plate portion attached to each end of said longitudinal main plate portion, each of said end plate portions having at least two wall members extending generally perpendicularly from said end plate portion for engaging different external edge surfaces of a brakehead to which said three-piece backing plate is attachable, wherein at least one of said at least two wall members extending generally perpendicularly from said end plate portion engages an external side edge surface of said brakehead.

2. A three-piece backing plate for a railway vehicle brake shoe, according to claim 1, in which each of said end plate portions further includes means for attaching said end plate portion to said main plate portion.

3. A three-piece backing plate for a railway vehicle brake shoe, according to claim 2, in which said means for securing said end-plate portion to a longitudinal end of said main plate portion comprises a tongue member insertable into a first aperture adjacent an end edge of said main plate portion.

4. A three-piece backing plate for a railway vehicle brake shoe, according to claim 3, in which said tongue member is further insertable into a second aperture in a face surface of such brakehead to which said three-piece backing plate is attachable, said second aperture being aligned with said first aperture.

5. A three-piece backing plate for a railway vehicle brake shoe, according to claim 1, in which said at least one wall member comprises a plurality of such wall members.

6. A three-piece backing plate for a railway vehicle brake shoe, according to claim 1, in which each of said end plate portions further include a lug member extending generally perpendicularly from said end plate portion adapted to fit within an aperture in the surface of such brakehead to which said three-piece backing plate is attachable.

7. A brake shoe for railway vehicles having a three-piece backing plate, said three-piece backing plate comprising a longitudinal main plate portion having a concave front surface to which a friction material is bonded, and an end-plate portion attached to each end of said longitudinal main plate portion, each of said end plate portions having means for securing said end plate portion to a longitudinal end of said main plate portion and at least two wall members extending generally perpendicularly from said end plate portion and from a convex surface of said main plate portion, said at least two wall members engaging different external edge surfaces of a brakehead to which said backing plate is attachable, wherein at least one of said at least two wall members extending generally perpendicularly from said end plate portion engages an external side edge surface of said brakehead.

8. A brake shoe for railway vehicles, according to claim 7, in which said at least one wall member comprises a plurality of such wall members, each adapted to engage a side surface of such brakehead.

9. A brake shoe for railway vehicles, according to claim 7, in which said means for securing said end-plate portion to a longitudinal end of said main plate portion comprises a tongue member insertable into a first aperture adjacent an end edge of said main plate portion.

10. A brake shoe for railway vehicles, according to claim 9, in which said tongue member is insertable through said first aperture and further insertable into a second aperture in a face surface of such brakehead to which said three-piece backing plate is attachable, said first and second apertures being aligned.

11. A brake shoe for railway vehicles comprising an elongated body of friction material bonded to a concave inner face of a three-piece backing plate, said three-piece backing plate comprising a longitudinal main plate portion having an end-plate portion attached at each longitudinal end thereof, said main plate portion having a lock means protruding outwardly from a rear face thereof for attaching said three-piece backing plate to a brakehead, and an elongated aperture adjacent to each longitudinal outer end thereof, each of said end plate portions having an outwardly extending tongue member insertable through one of said elongated aperture for securing said end plate portion to an end of said main plate portion, and at least two wall members extending generally perpendicularly from said end plate portion for engagement with different exterior edge surfaces of a brakehead to which said backing plate is attachable, wherein at least one of said at least two wall members extending generally perpendicularly from said end plate portion engages an external side edge surface of said brakehead.

12. A brake shoe for railway vehicles, according to claim 11, in which said at least one wall member comprises a plurality of such wall members, each adapted to engage a side surface of such brakehead.

13. A brake shoe for railway vehicles, according to claim 12, in which said plurality of such wall members, comprise three such wall members adapted to form a three-sided box-like frame around an end of a brakehead to which it is attachable.

14. A brake shoe for railway vehicles, according to claim 13, in which said tongue member extends from a middle of said three wall members, said tongue member insertable into a first aperture adjacent to an end edge of said main plate portion.

15. A brake shoe for railway vehicles, according to claim 14, in which said tongue member is insertable through said first aperture in said main plate portion and further insertable into a second aperture in a face surface of such brakehead to which said three-piece backing plate is attachable, said first and second apertures being aligned.

16. A brake shoe for railway vehicles, according to claim 11, in which said lock means comprises a keybridge.

17. A brake shoe for railway vehicles, according to claim 11, in which said main plate portion and said end plate portion are fabricated of a sheet steel.

18. A brake shoe for railway vehicles, according to claim 17, in which said end plate portions are formed by bending sheet steel blanks into a three-sided rectangular form, said form having a pair of opposed faces one of which forms said at least one wall member, and in which said outwardly extending tongue member extends from a third wall member.

19. A brake shoe for railway vehicles comprising an arcuate, elongated body of friction material bonded to a concave inner face of an arcuate three-piece backing plate, said arcuate three-piece backing plate comprising an arcuate longitudinal main plate portion having an end-plate portion attached at each longitudinal end of said main plate portion, said main plate portion having a centrally disposed key-bridge protruding outwardly from a convex face thereof for attaching said three-piece backing plate to a concave face of a brakehead, and an elongated slot spaced from and parallel to an outer edge thereof, each of said end plate portions having an outwardly extending tongue member adapted to be inserted through one of said elongated slots for securing said end plate to said outer edge of said main plate, and each of said end-plates having a pair of opposed and parallel side-wall portions extending perpendicularly outwardly between opposed side edges of said main plate and extending further outwardly by a distance sufficient to engage opposed external side edges of such brakehead.

20. A brake shoe for railway vehicles, according to claim 19, further including a pair of tab members extending oppositely from said pair of opposed and parallel side-wall portions adapted to be bent under said main plate portion to better attach said end plate portions to said main plate portion.

\* \* \* \* \*